(12) United States Patent
Maesaka et al.

(10) Patent No.: US 8,499,805 B2
(45) Date of Patent: Aug. 6, 2013

(54) RUBBER COMPOSITION FOR A WINTER TIRE TREAD

(75) Inventors: Masayuki Maesaka, Gunma (JP); Salvatore Pagano, Tokyo (JP); Makiko Watanabe, Tokyo (JP)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 31 days.

(21) Appl. No.: 13/055,647

(22) PCT Filed: Jul. 20, 2009

(86) PCT No.: PCT/EP2009/005243
§ 371 (c)(1),
(2), (4) Date: Apr. 14, 2011

(87) PCT Pub. No.: WO2010/009850
PCT Pub. Date: Jan. 28, 2010

(65) Prior Publication Data
US 2011/0190416 A1    Aug. 4, 2011

(30) Foreign Application Priority Data

Jul. 24, 2008 (FR) ...................... 08 55038

(51) Int. Cl.
*B60C 11/00* (2006.01)
*B60C 1/00* (2006.01)
*C08K 3/30* (2006.01)
*C08L 55/00* (2006.01)
*C08L 9/00* (2006.01)
*C08L 7/00* (2006.01)

(52) U.S. Cl.
USPC ........ 152/209.1; 152/905; 524/423; 524/554; 524/571; 524/575; 524/575.5; 524/526

(58) Field of Classification Search
USPC .......................................... 524/423
See application file for complete search history.

(56) References Cited

U.S. PATENT DOCUMENTS

| 2,739,135 | A |   | 3/1956  | Delang              |         |
|-----------|---|---|---------|---------------------|---------|
| 3,423,265 | A |   | 1/1969  | Ahles et al.        |         |
| 3,938,574 | A | * | 2/1976  | Burmester et al.    | 152/209.1 |
| 4,840,988 | A |   | 6/1989  | Nakayama et al.     |         |
| 7,825,183 | B2| * | 11/2010 | Robert et al.       | 524/476 |

FOREIGN PATENT DOCUMENTS

| EP | 1561605 A2   | * | 8/2005 |
| EP | 1 829 934    |   | 9/2007 |
| EP | 1829934 A1   | * | 9/2007 |
| JP | 2008222845 A | * | 9/2008 |
| WO | WO 2006061064 A1 | * | 6/2006 |

OTHER PUBLICATIONS

JP 2008-222845 A (2008), machine translation, JPO Advanced Industrial Property Network (AIPN).*

* cited by examiner

*Primary Examiner* — David W Wu
*Assistant Examiner* — Josephine Chang
(74) *Attorney, Agent, or Firm* — Cozen O'Connor

(57) ABSTRACT

A rubber composition usable as tread for a winter tire, having a high grip on melting ice, comprising at least one diene elastomer such as natural rubber and/or a polybutadiene, more than 30 phr of a liquid plasticizing agent, between 50 and 150 phr of a reinforcing filler such as silica and/or carbon black, and between 5 and 40 phr of magnesium sulphate microparticles.

22 Claims, 1 Drawing Sheet

RUBBER COMPOSITION FOR A WINTER TIRE TREAD

RELATED APPLICATION

This is a U.S. National Phase Application under 35 USC 371 of International Application PCT/EP2009/005243, filed on Jul. 20, 2009.

This application claims the priority of French patent application Ser. No. 08/55038 filed Jul. 24, 2008, the entire content of which is hereby incorporated by reference.

FIELD OF THE INVENTION

The invention relates to rubber compositions which can be used in particular as treads for "winter tires" capable of rolling over ground surfaces covered with ice or black ice without being provided with studs (also known as studless tires).

It relates more particularly to treads for winter tires specifically suited to rolling under "melting ice" conditions encountered within a temperature range typically of between −5° C. and 0° C. It should specifically be remembered that, within such a range, the pressure of the tires during the passage of a vehicle brings about surface melting of the ice, which is covered with a thin film of water harmful to the grip of these tires.

BACKGROUND OF THE INVENTION

In order to avoid the harmful effects of the studs, in particular their strong abrasive action on the surfacing of the ground surface itself and a significantly deteriorated road behaviour on a dry ground surface, tire manufacturers have provided different solutions which consist of modifying the formulation of rubber compositions themselves.

Thus, a proposal has been made, first of all, to incorporate solid particles of high hardness, such as, for example, silicon carbide (see, for example U.S. Pat. No. 3,878,147), some of which will come to the surface of the tread as the latter wears and thus come into contact with the ice. Such particles, capable of acting in fact as micro-studs on hard ice, by virtue of a well-known "claw" effect, remain relatively aggressive with regard to the ground surface; they are not well suited to rolling conditions on melting ice.

Other solutions have thus been proposed which consist in particular in incorporating water-soluble powders in the constituent composition of the tread. Such powders dissolve more or less on contact with the snow or the melting ice, which makes possible, on the one hand, the creation at the surface of the tire tread of porosities capable of improving the grip of the tread to the ground surface and, on the other hand, the creation of grooves which act as channels for discharging the liquid film created between the tire and the ground surface. Mention may be made, as examples of water-soluble powders, for example, of the use of cellulose powder, vinyl alcohol powder or starch powder (see for example, Patent Applications JP 3-159803, and JP 2002-211203).

In all these examples, the solubility at very low temperature and within a very short time of the powder used is an essential factor in the satisfactory operation of the tread. If the powder is not soluble under the conditions of use of the tire, the abovementioned functions (creation of microporosities and of channels for draining the water away) are not performed and the grip is not improved. Another known disadvantage of these solutions is that they can be highly disadvantageous to the reinforcing of the rubber composition (and thus to their wear resistance) or to their hysteresis (and thus to their rolling resistance).

SUMMARY OF THE INVENTION

One object of the invention is to provide a rubber composition which is capable of generating an effective surface micro-roughness by virtue of specific water-soluble microparticles and which makes it possible to improve the grip on ice of the treads and tires comprising them under melting ice conditions without being disadvantageous to the properties of reinforcement and hysteresis.

This and other objects are attained in accordance with one aspect of the invention directed to a rubber composition usable as tread for a winter tire and which comprises at least a diene elastomer, more than 30 phr of a liquid plasticizer, between 50 and 150 phr of a reinforcing filler, and between 5 and 40 phr of magnesium sulphate microparticles.

To start with, these magnesium sulphate microparticles, which protrude at the surface of the tread, perform the claw function described above without the disadvantage of being abrasive. Then, subsequently, after gradual expulsion from the rubber matrix, they release microcavities which act as storage volume and as channel for draining the film of water at the surface of the ice; under these conditions, the contact between the surface of the tread and the ice is no longer lubricated and the coefficient of friction is thus improved.

Such a rubber composition can be used in the manufacture of treads for winter tires, whether the treads are intended for new tires or for the retreading of worn tires.

Another aspect of the invention is these treads and these tires themselves when they comprise a rubber composition in accordance with the invention.

Tires in accordance with the invention are particularly intended to equip passenger motor vehicles, including 4×4 (four-wheel drive) vehicles and SW (Sport Utility Vehicles) vehicles, two-wheel vehicles (in particular motorcycles), and also industrial vehicles in particular chosen from vans and heavy-duty vehicles (i.e., underground, bus or heavy road transport vehicles (lorries, tractors, trailers)), or off-road vehicles, such as agricultural vehicles or earthmoving equipment.

BRIEF DESCRIPTION OF THE DRAWINGS

The invention and its advantages will be easily understood in the light of the description and exemplary embodiments which follow, and also of the Appended FIGS. 1 and 2 which reproduce a photo taken by an optical microscope (with a magnification of 50) at the surface of a tread of a control tire (FIG. 1) and at the surface of a tread of a tire according to the invention (FIG. 2), both new tires having previously been subjected to a first rolling of 2000 km, for running in and the beginning of wear.

I. MEASUREMENTS AND TESTS USED

Figure 1:
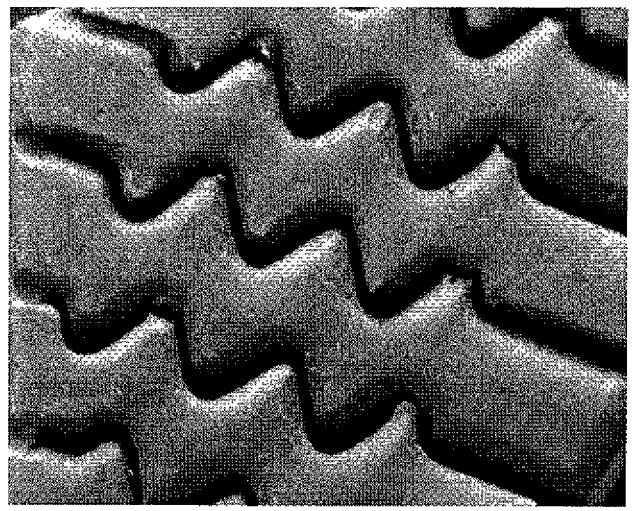

The treads and constituent rubber compositions of these treads are characterized, before and after curing, as indicated below.

I-1. Mooney Plasticity

Use is made of an oscillating consistometer as described in French Standard NF T 43-005 (November 1980). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 Newton·meter).

I-2. Scorch Time

The measurements are carried out at 130° C., in accordance with French Standard NF T 43-005. The change in the consistometric index as a function of time makes it possible to determine the scorch time of the rubber compositions, assessed to the above-mentioned standard, by the parameter T5 (case of a large rotor), expressed in minutes, and defined as being the time necessary to obtain an increase in the consistometric index (expressed in MU) of 5 units above the minimum value measured for this index.

I-3. Rheometry

The measurements are carried out at 150° C. with an oscillating disc rheometer, according to Standard DIN 53529-part 3 (June 1983). The change in the rheometric torque as a function of time describes the change in the stiffening of the composition as a result of the vulcanization reaction. The measurements are processed according to Standard DIN 53529-part 2 (March 1983): Ti is the induction period, that is to say the time necessary for the start of the vulcanization reaction; $T_\alpha$ (for example $T_{90}$) is the time necessary to achieve a conversion of $\alpha\%$, that is to say $\alpha\%$ (for example 90%) of the difference between the minimum and maximum torques.

I-4. Tensile Tests

These tensile tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after a cycle of accommodation to the degree of extension expected for the measurement itself) at 10% elongation (denoted M10), 100% elongation (denoted M100) and 300% elongation (denoted M300). The breaking stresses (in MPa) and the elongations of break (in %) are also measured. All these tensile measurements are carried out under the standard conditions of temperature (23±2° C.) and hygrometry (50±5% relative humidity), according to French Standard NF T 40-101 (December 1979).

I-5. Shore A Hardness

The Shore A hardness of the compositions after curing is assessed in accordance with Standard ASTM D 2240-86.

I-6. Dynamic Properties

The dynamic properties are measured on a viscosity analyser (Metravib VA4000), in accordance with Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, at a temperature of 0° C., is recorded. A strain amplitude sweep is carried out from 0.1% to 50% (overall cycle), and then from 50% to 1% (return cycle). The results made use of are the loss factor $\tan(\delta)$; the maximum value of $\tan(\delta)$ observed (denoted $\tan(\delta)_{max}$) between the values at 0.15% and at 50% strain (Payne effect) is shown for the return cycle.

I-7. Tests on Tires

The tires are fitted to a motor vehicle ("Honda Civic") equipped with an anti-lock braking system (ABS system) and with an anti-slipping system during acceleration (TCS system for traction control system).

A) Braking on Ice:

The distance necessary to change from 20 to 5 km/h during sudden longitudinal braking (ABS activated) on a track covered with ice is measured. A value greater to that of the control, arbitrarily set at 100, indicates an improved result, that is to say a shorter braking distance.

B) Acceleration on Ice:

The time necessary to change from 5 to 20 km/h during acceleration at full throttle under the control of the activated TCS system is measured. A value greater than that of the control, arbitrarily set at 100, indicates an improved result, that is to say a faster acceleration.

II. DETAILED DESCRIPTION OF THE INVENTION

The rubber composition of the invention is based on at least a diene elastomer, a plasticizing system, a reinforcing filler and magnesium sulphate microparticles, which components are described in detail below.

In the present description, unless expressly indicated otherwise, all the percentages (%) shown are % by weight. Moreover, any interval of values denoted by the expression "between a and b" represents the range of values extending from greater than a to less than b (that is to say, limits a and b excluded) whereas any interval of values denoted by the expression "from a to b" means the range of values extending from a up to b (that is to say, including the strict limits a and b).

II-1. Diene Elastomer

It should be remembered that "diene" elastomer or rubber should be understood as meaning an elastomer resulting at least in part (i.e., a homopolymer or a copolymer) from diene monomers (monomers carrying two carbon-carbon double bonds which may or may not be conjugated).

Diene elastomers can be classified in a known way into two categories: those "essentially unsaturated" and those "essentially saturated". Butyl rubbers, such as, for example copolymers of dienes and of α-olefins of EPDM type, come within the category of essentially saturated diene elastomers, having a content of units of diene origin which is low or very low, always less than 15% (mol %). In contrast, essentially unsaturated diene elastomer is understood to mean a diene elastomer resulting at least in part from conjugated diene monomers, having a content of units of diene origin (conjugated dienes) which is greater than 15% (mol %). In the category of "essentially unsaturated" diene elastomers, "highly unsaturated" diene elastomer is understood to mean in particular a diene elastomer having a content of units of diene origin (conjugated dienes) which is greater than 50%.

It is preferable to use at least one diene elastomer of the highly unsaturated type, in particular a diene elastomer chosen from the group consisting of polybutadienes (BR), synthetic polyisoprenes (IR), natural rubber (NR), butadiene copolymers, isoprene copolymers (other than IIR) and mixtures of these elastomers. Such copolymers are more preferably chosen from the group consisting of butadiene/stirene copolymers (SBR), isoprene/butadiene copolymers (BIR), isoprene/stirene copolymers (SIR), isoprene/butadiene/stirene copolymers (SBIR) and mixtures of such copolymers.

The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol functional groups or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of elastomers (such as SBR, BR, NR or IR) of the epoxidized type.

The following are preferably suitable: polybutadienes, in particular those having a content of 1,2-units of between 4% and 80% or those having a content of cis-1,4-units of greater than 80%, polyisoprenes, butadiene/stirene copolymers in particular those having a stirene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers, in particular those having an isoprene content of between 5% and 90% by weight and a glass transition temperature ("Tg"-measured according to ASTM D 3418-82) of −40° C. to −80° C., or isoprene/stirene copolymers, in particular those having a stirene content of between 5% and 50% by weight and a Tg of between −25° C. and −50° C.

In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/stirene/isoprene copolymer having a Tg of between −20° C. and −70° C., are suitable in particular.

According to a particularly preferred embodiment of the invention, the diene elastomer is chosen from the group consisting of natural rubber, synthetic polyisoprenes, polybutadienes having a content of cis-1,4 bonds of greater than 90%, butadiene/stirene copolymers and the mixtures of these elastomers.

According to a more particular and preferred embodiment, the diene elastomer used is predominantly, that is to say for more than 50 phr (it should be remembered that "phr" means parts by weight per 100 parts of elastomer), natural rubber (NR) or a synthetic polyisoprene (IR). More preferably, the said natural rubber or synthetic polyisoprene is then used as a blend with a polybutadiene (BR) having a content of cis-1,4 bonds which is preferably greater than 90%.

According to another particular and preferred embodiment, the diene elastomer used is predominantly, that is to say for more than 50 phr, a polybutadiene (BR) having a content of cis-1,4 bonds of greater than 90%. More preferably, said polybutadiene is then used as a blend with natural rubber or a synthetic polyisoprene.

According to another particular and preferred embodiment, the diene elastomer used is a binary blend (mixture) of NR (or IR) and of BR, or a ternary blend of NR (or IR), BR and SBR. Preferably in the case of such blends, the composition comprises between 25 and 75 phr of NR (or IR) and between 75 and 25 phr of BR, with which may or may not be associated a third elastomer (ternary blend) at a content of less than 30 phr, in particular of less than 20 phr. This third elastomer is preferably an SBR elastomer, in particular a solution SBR ("SSBR"). More preferably still, in the case of such a blend, the composition comprises from 35 to 65 phr of NR (or IR) and from 65 to 35 phr of BR. The BR used is preferably a BR having a content of cis-1,4 bonds of greater than 90%, more preferably of greater than 95%.

Synthetic elastomers other than diene elastomers, indeed even polymers other than elastomers, for example thermoplastic polymers, might be combined, in a minor amount, with the diene elastomers of the compositions of the invention.

II-2. Plasticizing System

The rubber composition of the invention has as other essential characteristic that of comprising at least 30 phr of a plasticizing agent which is liquid (at 23° C.), the role of which is to soften the matrix by diluting the elastomer and the reinforcing filler; its Tg is by definition less than −20° C., preferably less than −40° C.

Any extending oil, whether of aromatic or non-aromatic nature, any liquid plasticizing agent known for its plasticizing properties with regard to diene elastomers, can be used. At ambient temperature (23° C.), these plasticizers or these oils, which are more or less viscous, are liquids (that is to say, as a reminder, substances that have the ability to eventually take on the shape of their container), as opposed, in particular, to plasticizing hydrocarbon resins which are by nature solid at ambient temperature.

Liquid plasticizers chosen from the group consisting of naphthenic oils (low or high viscosity, in particular hydrogenated or otherwise), paraffinic oils, MES (Medium Extracted Solvates) oils, TDAE oils (Treated Distillate Aromatic Extracts), mineral oils, plant oils, ether plasticizers, ester plasticizers, phosphate plasticizers, sulphonate plasticizers and the mixtures of these compounds are particularly suitable.

Mention may be made, as phosphate plasticizers for example, of those that contain between 12 and 30 carbon atoms, for example trioctyl phosphate. As examples of ester plasticizers, mention may especially be made of the compounds chosen from the group consisting of trimellitates, pyromellitates, phthalates, 1,2-cyclohexane dicarboxylates, adipates, azelates, sebacates, triesters of glycerol, and mixtures of these compounds. Among the above triesters, mention may be made of glycerol triesters, preferably composed predominantly (for more than 50% by weight, more preferably for more than 80% by weight) of an unsaturated $C_{18}$ fatty acid, that is to say an unsaturated fatty acid chosen from the group consisting of oleic acid, linoleic acid, linolenic acid and the mixtures of these acids. More preferably, whether of synthetic origin or natural origin (in the case, for example, of sunflower or rapeseed vegetable oils), the fatty acid used is composed for more than 50% by weight, more preferably still from 80% by weight, of oleic acid. Such triesters (trioleates) comprising a high content of oleic acid are well known; for example they have been described in Application WO 02/088238, as plasticizing agents in treads for tires.

The content of liquid plasticizer in the composition of the invention is preferably greater than 40 phr, more preferably included within a range from 50 to 100 phr.

According to another preferred embodiment, the compositions of the invention can also comprise, as plasticizer which is solid (at 23° C.), a hydrocarbon resin exhibiting a Tg of greater than +20° C., preferably greater than +30° C., such as is described, for example in Applications WO 2005/087859, WO 2006/061064 and WO 2007/017060.

Hydrocarbon resins are polymers well known to a person skilled in the art which are essentially based on carbon and hydrogen and thus miscible by nature in diene elastomer composition(s), when they are additionally described as being "plasticizing". They have been described, for example, in the work entitled "*Hydrocarbon Resins*" by R. Mildenberg, M. Zander and G. Collin (New York, VCH, 1997, ISBN 3-527-28617-9), chapter 5 of which is devoted to their applications, in particular in the tire rubber field (5.5. "*Rubber Tires and Mechanical Goods*"). They can be aliphatic or aromatic or also of the aliphatic/aromatic type, that is to say based on aliphatic and/or aromatic monomers. They can be natural or synthetic and may or may not be oil-based (if such is the case, also known under the name of petroleum resins). They are preferably exclusively hydrocarbon, that is to say that they comprise only carbon and hydrogen atoms.

Preferably, the plasticizing hydrocarbon resin exhibits at least one, more preferably all, of the following characteristics:

- a Tg of greater than 20° C. (more preferably between 40 and 100° C.;
- a number-average molecular weight (Mn) of between 400 and 2000 g/mol (more preferably between 500 and 1500 g/mol);
- a polydispersity index (PI) of less than 3, more preferably less than 2 (reminder: PI=Mw/Mn with Mw the weight-average molecular weight).

The Tg is measured in a known way by DSC (Differential Scanning Calorimetry) according to Standard ASTM D3418 (1999). The macrostructure (Mw, Mn and PI) of the hydrocarbon resin is determined by steric exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

According to a particularly preferred embodiment, the plasticizing hydrocarbon resin is chosen from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins and the mixtures of these resins. Use is more preferably made, among the above copolymer resins, of those chosen from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, $C_9$ fraction/vinylaromatic copolymer resins, and the mixtures of these resins.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Stirene, α-methylstyrene, ortho-, meta- or para-methylstirene, vinyltoluene, para-(tert-butyl)styrene, methoxystyrenes, chlorostirenes, hydroxystirenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is stirene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The content of hydrocarbon resin is preferably between 3 and 60 phr, more preferably between 3 and 40 phr, in particular between 5 and 30 phr.

The content of total plasticizing agent (i.e., liquid plasticizer plus, if appropriate, solid hydrocarbon resin) is preferably between 40 and 100 phr, more preferably included within a range of from 50 to 80 phr.

II-3. Reinforcing Filler

Use may be made of any type of reinforcing filler known for its capabilities of reinforcing a rubber composition which can be used for the manufacture of tires, for example an organic filler, such as carbon black, or a reinforcing inorganic filler, such as silica, with which a coupling agent is combined in a known way.

Such a reinforcing filler typically consists of nanoparticles, the mean size (by weight) of which is less than 500 nm, generally between 20 and 200 nm, in particular and preferably between 20 and 150 nm.

All carbon blacks, in particular blacks of the HAF, ISAF or SAF type, conventionally used in treads for tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks. The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinyl organic fillers as described in Applications WO 2006/069792, WO 2006/069793, WO2008/003434 and WO2008/003435.

The term "reinforcing inorganic filler" should be understood here as meaning any inorganic or mineral filler, whatever its colour and its origin (natural or synthetic), also known as "white filler" or sometimes "clear filler" in contrast to carbon black, capable of reinforcing by itself, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$, in particular between 60 and 300 $m^2/g$. Mention will be made, as highly dispersible ("HD precipitated silicas"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber. Mention may be made, as examples of reinforcing aluminas, of the "Baikalox A125" or "Baikalox CR125" aluminas from Baïkowski, the "APA-100RDX" alumina from Condea, the "Aluminoxid C" alumina from Degussa or the "AKP-G015" alumina from Sumitomo Chemicals.

Preferably, the content of total reinforcing filler (carbon black and/or reinforcing inorganic filler) is between 60 and 120 phr, in particular between 70 and 100 phr.

According to a specific embodiment, the reinforcing filler comprises predominantly carbon black; in such a case, the carbon black is present at a content preferably of greater than 60 phr, in combination or not with a reinforcing inorganic filler, such as silica, in a minor amount.

According to another specific embodiment, the reinforcing filler comprises predominantly an inorganic filler, in particular silica; in such a case, the inorganic filler, in particular silica, is present at a content preferably of greater than 70 phr, in combination or not with carbon black in a minor amount; the carbon black, when it is present, is preferably used at a content of less than 20 phr, more preferably less than 10 phr (for example between 0.1 and 10 phr).

Independently of the first aspect of the invention, namely the search for optimized grip on melting ice, the predominant use of a reinforcing inorganic filler, such as silica, is also advantageous from the viewpoint of the grip on a wet or snowy ground surface.

According to another possible embodiment of the invention, the reinforcing filler comprises a blend of carbon black and of reinforcing inorganic filler such as silica, in similar amounts; in such a case, the content of inorganic filler, in particular silica, and the content of carbon black are preferably each between 25 and 75 phr, more particularly each between 30 and 50 phr.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made, in particular, of bifunctional organosilanes or polyorganosiloxanes.

Use is made in particular of silane polysulphides, referred to as "symmetrical" or "asymmetrical" depending on their specific structure, as described, for example, in Applications WO 03/002648 (or US 2005/016651) and WO 03/002649 (or US 2005/016650). "Symmetrical" silane polysulphides corresponding to the following general formula (I):

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

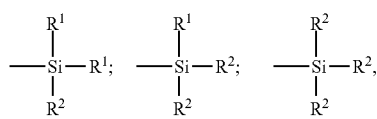

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

Mention will more particularly be made, as examples of silane polysulphides, of bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, or bis(triethoxysilylpropyl)disulphide, abbreviated to TESPD. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 2 and 12 phr, more preferably between 3 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II-4. Magnesium Sulphate Microparticles

The rubber compositions of the invention have the essential characteristic of comprising between 5 and 40 phr of magnesium sulphate microparticles.

Microparticles is understood to mean, by definition and in general, particles of micrometric size, that is to say for which the mean size or median size (both expressed by weight) are between 1 μm and 1 mm. Preferably, the median size is between 2 μm and 800 μm.

Below the minima indicated above, there is a risk that the targeted technical effect (namely the creation of a suitable micro-roughness) will be inadequate whereas, above the maxima indicated, various disadvantages emerge, in particular when the rubber composition is used as tread: apart from a possible aesthetic loss (particles too visible on the surface of the tread) and a risk of loss of cohesion during rolling of relatively large elements of the tread pattern, it being found that the grip performance on melting ice may be damaged.

For all these reasons, it is preferable for the microparticles to have a median size of between 2 μm and 500 μm, more preferably still included within a range of 5 to 200 μm. This particularly preferred size range appears to correspond to an optimized compromise between, on the one hand, a desired surface roughness and, on the other hand, good contact between the rubber composition and the ice.

Moreover, for identical reasons to those set out above, the content of microparticles is preferably between 5 and 40 phr, more preferably between 10 and 35 phr.

Various known methods are applicable for the analysis of the particle size and the calculation of the median size of the microparticles (or median diameter for microparticles assumed to be substantially spherical), for example by laser diffraction (see, for example Standard ISO-8130-13 or Standard HS K5600-9-3).

Use may also simply and preferably be made of an analysis of the particle size by mechanical sieving; the operation consists of sieving a defined amount of sample (for example 200 g) on a vibrating table for 30 min with different sieve diameters (for example, according to a progressive ratio equal to 1.26, with meshes of 1000, 800, 630, 500, 400, . . . 100, 80, and 63 µm); the oversize collected in each sieve is weighed on a precision balance; the % of oversize for each mesh diameter with respect to the total weight of product is deduced therefrom; the median size (or median diameter) or mean size (or mean diameter) is finally calculated in a known way from the histogram of the particle size distribution.

II-5. Various Additives

The rubber compositions of the invention also comprise all or a portion of the usual additives generally used in the elastomer compositions intended for the manufacture of treads for tires, in particular for winter tires, such as, for example, protection agents, such as antiozone waxes, chemical antiozonants, antioxidants, reinforcing resins, methylene acceptors (for example phenolic novolak resin) or methylene donors (for example HMT or H3M), a crosslinking system based either on sulphur or on donors of sulphur and/or peroxide and/or bismaleimides, vulcanization accelerators, or vulcanization activators.

These compositions can also comprise coupling activators when a coupling agent is used, agents for covering the inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

II-6. Manufacture of the Rubber Compositions and of the Treads

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated.

A process which can be used for the manufacture of such compositions comprises, for example and preferably, the following steps:

incorporating in the diene elastomer, in a mixer, more than 30 phr of a liquid plasticizer, between 50 and 150 phr of a reinforcing filler, between 5 and 40 phr of magnesium sulphate particles, everything being kneaded thermomechanically, in one or more goes, until a maximum temperature of between 130° C. and 200° C. is reached;
cooling the combined mixture to a temperature of less than 100° C.;
subsequently incorporating a crosslinking system;
kneading everything up to a maximum temperature of less than 120° C.;
extruding or calendering the rubber composition thus obtained, in particular in the form of a tire tread.

By way of example, the first (non-productive) phase is carried out in a single thermomechanical stage during which all the necessary constituents, the optional additional covering agents or processing aids, and various other additives, with the exception of the crosslinking system, are introduced into an appropriate mixer, such as a normal internal mixer. After cooling the mixture thus obtained during the first non-productive phase, the crosslinking system is then incorporated at low temperature, generally in an external mixer, such as an open mill; everything is then mixed (productive phase) for a few minutes, for example between 5 and 15 min.

The crosslinking system proper is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 3.0 phr, and that of the primary accelerator is preferably between 0.5 and 5.0 phr.

Use may be made, as accelerator (primary or secondary) of any compound capable of acting as accelerator of the vulcanization of diene elastomers in the presence of sulphur, in particular accelerators of the thiazoles type and their derivatives, accelerators of thiurams types, or zinc dithiocarbamates. These accelerators are more preferably chosen from the group consisting of 2-mercaptobenzothiazyl disulphide (abbreviated to "MBTS"), N-cyclohexyl-2-benzothiazole-sulphenamide (abbreviated to "CBS"), N,N-dicyclohexyl-2-benzothiazolesulphenamide ("DCBS"), N-tert-butyl-2-benzothiazolesulphenamide ("TBBS"), N-tert-butyl-2-benzothiazolesulphenimide ("TBSI"), zinc dibenzyldithiocarbamate ("ZBEC") and the mixtures of these compounds.

The final composition thus obtained is subsequently calendered, for example in the form of a sheet or of a plaque, in particular for laboratory characterization, or else extruded in the form of a rubber profiled element which can be used directly as winter tire tread.

The vulcanization (or curing) is carried out in a known way at a temperature generally of between 130° C. and 200° C. for a sufficient time which can vary, for example, between 5 and 90 min depending in particular on the curing temperature, the vulcanization system adopted and the vulcanization kinetics of the composition under consideration.

The rubber compositions according to the invention can constitute all or a portion only of the tread in accordance with the invention, in the case of a tread of composite type formed from several rubber compositions of different formulations.

The invention relates to the rubber compositions and to the treads described above, both in the raw state (i.e., before curing) and in the cured state (i.e., after crosslinking or vulcanization).

III. EXAMPLES OF THE IMPLEMENTATION OF THE INVENTION

III-1. Preparation of the Rubber Compositions and of the Treads

The tests which follow are carried out in the following way: the reinforcing filler (for example a reinforcing inorganic filler, such as silica, and its associated coupling agent), the liquid plasticizer, the magnesium sulphate microparticles, the diene elastomer (or blend of diene elastomers) and the various other ingredients, with the exception of the vulcanization system, are successively introduced into an internal mixer having an initial vessel temperature of approximately 60° C.; the mixer is thus approximately 70% full (% by volume). Thermomechanical working (non-productive phase) is then carried out in one stage, which lasts in total approximately 3 to 4 minutes, until a maximum "dropping" temperature of 165° C. is reached. The mixture thus obtained is recovered and cooled and then sulphur and an accelerator of sulphenamide type are incorporated on an external mixer (homofinisher) at 30° C., everything being mixed (productive phase) for an appropriate time (for example between 5 and 12 min).

The compositions thus obtained are subsequently calendered, either in the form of plaques (thickness of 2 to 3 mm) or of fine sheets of rubber, for the measurement of their physical or mechanical properties, or extruded in the form of treads for winter tires for passenger vehicles.

III-2. Rubber Tests

In this test, two compositions (identified as C-1 and C-2) based on diene elastomers (NR and BR blend comprising a content of cis-1,4 bonds of greater than 95%), are compared, which compositions are reinforced with a blend of silica and carbon black with which is or is not combined a fraction (20 phr) of magnesium sulphate microparticles.

The formulations of the two compositions (Table 1—contents of the various products expressed in phr) and their properties before and after curing (30 min at 150° C.) are given in Tables 1 and 2; the vulcanization system is composed of sulphur and sulphenamide.

The amount of liquid plasticizer was adjusted in the composition of the invention C-2 in order to keep the stiffness at the same level as that of the control composition C-1 (Shore A hardness equal to around 55 in both cases): in a known manner, an identical stiffness is the condition necessary for a rigorous comparison of the rolling performances on ice (paragraph III-3).

First of all, the examination of the various results in Table 2 does not reveal any significant deterioration in the rubber properties for the composition of the invention (C-2), despite the presence of a high content of magnesium sulphate microparticles, which already constitutes an unexpected result for a person skilled in the art:

the processability in the raw state (Mooney plasticity) remains comparable;

the rheometric (curing) properties are not substantially modified, the scorch safety (T5) even being increased by 2 min;

after curing, Shore hardness and moduli in extension remain constant, which is favourable to the mechanical behaviour of the tread and thus to the road performance of the tire;

the decline in the breaking stress is very slight;

finally, the hysteresis has not deteriorated, and has even improved (tan($\delta$)$_{max}$ value reduced by approximately 20%).

It is in fact only during actual running tests carried out on tires that the unexpected result introduced by the invention is revealed, as is clearly shown by the following tests.

III-3. Tests on Tires

The compositions C-1 and C-2 tested above are subsequently used as treads for radial carcass passenger vehicle winter tires, respectively denoted T-1 (control tires) and T-2 (tires in accordance with the invention), with a size of 205/65 R15 conventionally manufactured and in all respects identical apart from the rubber compositions forming their treads.

All the tires are fitted to the front and rear of a motor vehicle, under nominal tire pressure, and are first of all subjected to rolling on a circuit (of approximately 2000 km), on a dry ground surface for running in and the beginning of wear.

The tires, thus run in, are then subjected to the tests of grip on ice as described in the preceding section I-7, according to different temperature conditions.

The results of the running tests are reported in Table 3, in relative units, the base 100 being selected for the control tire T-1 (it should be remembered that a value of greater than 100 indicates an improved performance).

It is found that the braking and acceleration on melting ice ($-3°$ C.) are both significantly improved for the tires in accordance with the invention (T-2) whereas no effect is visible for a temperature below $-5°$ C. (no substantial improvement to braking at a temperature of $-8$%). This is clearly the demonstration that the grip on melting ice is a specific problem which requires highly specific solutions.

Two other compositions were prepared as indicated above, based in diene elastomers reinforced with a blend of silica and carbon black (40 phr of each) but additionally comprising 10 phr of a hydrocarbon resin (polylimonene resin) as a solid plasticizer, with which a fraction (20 phr) of magnesium sulphate microparticles were or were not combined. This hydrocarbon resin has all of the following preferential characteristics:

a Tg between 40 and 100° C.;

an average molecular weight Mn between 500 and 1500 g/mol; and a PI index of less than 2.

Table 4 gives the formulation of the two compositions (amounts of the various products expressed in phr). The control composition is denoted by C-3, the composition in accordance with the invention denoted by C-4 is that comprising the magnesium sulphate microparticles. The amount of liquid plasticizer was adjusted in the composition C-4 in order to keep the stiffness at the same level as that of the control composition C-3 (Shore A hardness equal to around 52 in both cases).

These two compositions C-3 and C-4 were then used as treads for radial carcass passenger vehicle winter tires, respectively denoted T-3 (control tires) and T-4 (tires in accordance with the invention), with sizes of 205/55 R16 conventionally manufactured and in all respects identical apart from the constituent rubber compositions of their treads. These tires were tested under the same conditions as before for the tires T-1 and T-2.

The results of the running tests are reported in Table 5, in relative units, the base 100 being selected for the control tire T-3 (it should be remembered that a value of greater than 100 indicates an improved performance).

It is noted in this Table 5 that the improvement of the grip performances (braking and acceleration) of the tires of the invention (T-4 tires) is again very substantially increased in comparison to the preceding tests (T-2 tires), in the presence of the hydrocarbon resin.

Figure 2:
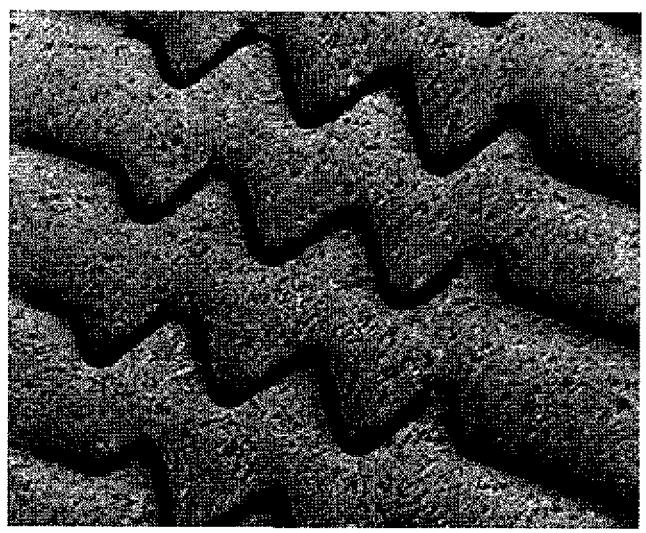

Moreover, optical microscopy photographs (in the appended figures, 1 cm represents approximately 1.25 mm) were taken at the surface of the tread of the control tires T-3 (photo from FIG. 1) and at the surface of the tread of the tires in accordance with the invention T-4 (photo from FIG. 2), after running in for 2000 km over dry ground and therefore a beginning of wear. FIG. 2 (tire of the invention), compared to FIG. 1 (control tire), clearly illustrates by itself the ability of the composition of the invention to generate an effective and significant surface micro-roughness by virtue of its water-soluble magnesium sulphate-microparticles.

III-4. Friction Tests

Additional tests were carried out in which another composition, denoted by C-5 and having the same formulation as the composition C-4 in accordance with the invention but differing from the latter by the nature of the water-soluble microparticles used, was compared with the preceding compositions C-3 and C-4:

- composition C-3: control composition (without microparticles);
- composition C-4: composition in accordance with the invention, with 20 phr of magnesium sulphate microparticles (median size of around 100 μm);
- composition C-5: composition not in accordance with the invention comprising 20 phr of magnesium carbonate microparticles, the median size of which is around 40 μm, available from Kanto Kagaku (ref. 25008-01).

All the median sizes indicated above were measured by mechanical sieving as indicated in paragraph II-4 above. Only the composition C-4 comprising magnesium sulphate microparticles was therefore in accordance with the invention.

These three compositions were subjected to a laboratory test consisting in measuring their friction coefficient on ice. The principle is based on a block of rubber composition that slides at a given speed (for example equal to 5 km/h) over an ice track with an imposed load (for example equal to 3 kg/cm$^2$). The forces generated in the direction of travel (Fx) of the block and perpendicular to the travel (Fz) are measured. The Fx/Fz ratio determines the friction coefficient of the test specimen on the ice. The temperature during the measurement is set at −2° C.

This test, the principle of which is well known to a person skilled in the art (see, for example, patent applications EP 1 052 270 and EP 1 505 112) makes it possible to evaluate, under representative conditions, the grip on melting ice which would be obtained after a running test on a vehicle fitted with tires whose tread is composed of the same rubber compositions.

The results are expressed in Table 6. A value above that of the control (composition C-3), arbitrarily set at 100, indicates an improved result, that is to say an aptitude for shorter braking distance. It is observed in this Table 6 that only the composition C-4 in accordance with the invention has a very definite increase (close to 10%) in the friction coefficient on ice, relative to the control composition C-3; the other composition C-5, which is not in accordance with the invention does not modify the friction coefficient relative to the control composition C-3.

In conclusion, the compositions in accordance with the invention comprising magnesium sulphate microparticles give the tires and their treads a combined grip and acceleration performance on melting ice that is significantly improved.

TABLE 1

| | Composition No.: | |
|---|---|---|
| | C-1 | C-2 |
| BR (1) | 60 | 60 |
| NR (2) | 40 | 40 |
| Silica (3) | 80 | 80 |
| Coupling agent (4) | 5 | 5 |
| Microparticles (5) | — | 20 |
| Carbon black (6) | 5 | 5 |
| Non aromatic oil (7) | 65 | 60 |
| DPG (8) | 1.5 | 1.5 |
| ZnO | 1.2 | 1.2 |
| Stearic acid | 1 | 1 |
| Antiozone wax | 1.5 | 1.5 |
| Antioxidant (9) | 2 | 2 |
| Sulphur | 2 | 2 |
| Accelerator (10) | 1.7 | 1.7 |

(1) BR with 4.3% of 1,2-; 2.7% of trans; 97% of cis-1,4-(Tg = −104° C.);
(2) Natural rubber (peptised);
(3) Silica "Zeosil 1115MP" from Rhodia, "HDS" type (BET and CTAB: approximately 120 m$^2$/g);
(4) Coupling agent TESPT ("Si69" from Degussa);
(5) Magnesium sulphate (from Aldrich; median size of the particles: approximately 100 μm);
(6) Grade ASTM N234 (Cabot);
(7) MES oil ("Catenex SNR" from Shell);
(8) Diphenylguanidine (Perkacit DPG from Flexsys);
(9) N-(1,3-dimethylbutyl)-N-phenyl-para-phenylenediamine (Santoflex 6-PPD from Flexsys);
(10) N-dicyclohexyl-2-benzothiazolesulphenamide ("Santocure CBS" from Flexsys).

TABLE 2

| | Composition No.: | |
|---|---|---|
| | C-1 | C-2 |
| Properties before curing | | |
| Mooney (MU) | 54 | 60 |
| T5 (min) | 13 | 15 |
| Ti (min) | 2.1 | 1.8 |
| T$_{90}$ (min) | 17 | 18 |
| T$_{90}$-Ti (min) | 13.7 | 13.2 |
| Properties after curing: | | |
| Shore A | 55 | 55 |
| M10 (MPa) | 3.4 | 3.5 |
| M100 (MPa) | 1.1 | 1.1 |
| M300 (MPa) | 1.0 | 1.0 |
| Breaking stress (MPa) | 13.9 | 12.6 |
| Elongation at break (%) | 540 | 560 |
| tan(δ)$_{max}$ (0° C.) | 0.280 | 0.220 |

TABLE 3

| | Tire No.: | |
|---|---|---|
| | T-1 | T-2 |
| Braking on ice (−3° C.) | 100 | 114 |
| Braking on ice (−8° C.) | 100 | 102 |
| Acceleration on ice (−4° C.) | 100 | 105 |

TABLE 4

| | Composition No.: | |
|---|---|---|
| | C-3 | C-4 |
| BR (1) | 60 | 60 |
| NR (2) | 40 | 40 |
| Silica (3) | 40 | 40 |
| Coupling agent (4) | 3 | 3 |
| Microparticles (5) | — | 20 |
| Carbon black (6) | 40 | 40 |
| Non aromatic oil (7) | 35 | 45 |
| Hydrocarbon resin (11) | 10 | 10 |
| DPG (8) | 0.8 | 0.8 |
| ZnO | 1.0 | 1.0 |
| Stearic acid | 1 | 1 |
| Antiozone wax | 1.5 | 1.5 |

TABLE 4-continued

| | Composition No.: | |
|---|---|---|
| | C-3 | C-4 |
| Antioxidant (9) | 2 | 2 |
| Sulphur | 2 | 2 |
| Accelerator (10) | 1.7 | 1.7 |

(1) to (10): idem Table 1;
(11) Polylimonene resin (Dercolyte L120 from DRT; Tg = 72° C., Mn = 625 g/mol; PI = 1.6).

TABLE 5

| | Tire: | |
|---|---|---|
| | T-3 | T-4 |
| Braking on ice (−1° C.) | 100 | 122 |
| Braking on ice (−6° C.) | 100 | 109 |
| Acceleration on ice (−3° C.) | 100 | 109 |

TABLE 6

| | Rubber composition: | | |
|---|---|---|---|
| | C-3 | C-4 | C-5 |
| Friction on ice (−2° C.) | 100 | 109 | 99 |

The invention claimed is:

1. A rubber composition comprising a diene elastomer, more than 30 phr of a liquid plasticizer, between 50 and 150 phr of a reinforcing filler, and between 5 and 40 phr of magnesium sulphate microparticles.

2. The composition according to claim 1, wherein the microparticles have a median size by weight of between 2 and 500 μm.

3. The composition according to claim 2, wherein the microparticles have a median size by weight of between 5 and 200 μm.

4. The composition according to claim 3, wherein the content of microparticles is between 10 and 35 phr.

5. The composition according to claim 1, wherein the diene elastomer is selected from the group consisting of natural rubber, synthetic polyisoprenes, polybutadienes, butadiene copolymers, isoprene copolymers and mixtures of these elastomers.

6. The composition according to claim 5, wherein the diene elastomer is selected from the group consisting of natural rubber, synthetic polyisoprenes, polybutadienes having a content of cis-1,4 bonds of greater than 90%, butadiene/styrene copolymers and mixtures of these elastomers.

7. The composition according to claim 6, comprising more than 50 phr of natural rubber or of synthetic polyisoprene.

8. The composition according to claim 7, wherein the natural rubber or the synthetic polyisoprene is a blend with a polybutadiene having a content of cis-1,4 bonds of greater than 90%.

9. The composition according to claim 6, comprising more than 50 phr of a polybutadiene having a content of cis-1,4 bonds of greater than 90%.

10. The composition according to claim 9, wherein the polybutadiene is a blend with natural rubber or a synthetic polyisoprene.

11. The composition according to claim 1, wherein the reinforcing filler predominantly comprises carbon black.

12. The composition according to claim 1, wherein the reinforcing filler predominantly comprises a reinforcing inorganic filler.

13. The composition according to claim 12, wherein the reinforcing inorganic filler is silica.

14. The composition according to claim 1, wherein the reinforcing filler comprises a blend of carbon black and of silica.

15. The composition according to claim 1, wherein the content of total reinforcing filler is between 60 and 120.

16. The composition according to claim 1, wherein the liquid plasticizer is selected from the group consisting of naphthenic oils, paraffinic oils, MES oils, TDAE oils, mineral oils, plant oils, ether plasticizers, ester plasticizers, phosphate plasticizers, sulphonate plasticizers and mixtures of these compounds.

17. The composition according to claim 16, wherein the content of liquid plasticizer is greater than 40 phr.

18. The composition according to claim 1, comprising a hydrocarbon resin exhibiting a Tg greater than 20° C.

19. The composition according to claim 18, wherein the hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, and mixtures of these resins.

20. The composition according to claim 18, wherein the content of hydrocarbon resin is between 3 and 60 phr.

21. A tread for a winter tire comprising a composition in accordance with claim 1.

22. A winter tire comprising a tread according to claim 21.

* * * * *